US010406680B2

United States Patent
Inoue et al.

(10) Patent No.: US 10,406,680 B2
(45) Date of Patent: Sep. 10, 2019

(54) INDUSTRIAL ROBOT

(71) Applicant: FANUC CORPORATION, Yamanashi (JP)

(72) Inventors: Toshihiko Inoue, Yamanashi (JP); Tooru Nagai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/946,959

(22) Filed: Apr. 6, 2018

(65) Prior Publication Data

US 2018/0333844 A1 Nov. 22, 2018

(30) Foreign Application Priority Data

May 22, 2017 (JP) .................. 2017-101025

(51) Int. Cl.
*B25J 9/04* (2006.01)
*B25J 17/02* (2006.01)
(Continued)

(52) U.S. Cl.
CPC ............... *B25J 9/047* (2013.01); *B23K 9/12* (2013.01); *B25J 9/08* (2013.01); *B25J 17/0283* (2013.01);
(Continued)

(58) Field of Classification Search
CPC .... B25J 17/0283; B25J 18/04; B25J 19/0041; B25J 9/047; H02K 5/18; H02K 5/22; H02K 5/225
(Continued)

(56) References Cited

U.S. PATENT DOCUMENTS 4,664,588 A * 5/1987 Newell ................ B23Q 1/0063
  294/86.4
5,488,215 A * 1/1996 Aronsson ............. B23K 11/318
  219/86.25
(Continued)

FOREIGN PATENT DOCUMENTS

DE  10141366 A1  10/2002
EP  2829368 A2   1/2015
(Continued)

OTHER PUBLICATIONS

Office Action dated Feb. 12, 2019 in corresponding Japanese Application No. 2017-101025; 7 pages.
(Continued)

*Primary Examiner* — Jake Cook
*Assistant Examiner* — Bobby Rushing, Jr.
(74) *Attorney, Agent, or Firm* — Maier & Maier, PLLC

(57) ABSTRACT

Provided is an industrial robot that includes: a second arm that is provided, at the distal end of a first arm pivotable about a first axis, in a pivotable manner about a second axis parallel to the first axis; and a wrist that is disposed at the distal end of the second arm and that has a plurality of wrist elements, and including the first wrist element provided in a rotatable manner about a longitudinal axis of the second arm. Motors and that drive the wrist elements, are accommodated in a space inside the first wrist element. The second arm is provided with a hollow portion that communicates with the space. A cable to be wired to the motors is wired into the hollow portion from the outside of the second arm and is relayed by a connector fixed to the wall section at the position of the through-hole.

2 Claims, 8 Drawing Sheets

(51) Int. Cl.
  *B25J 18/04* (2006.01)
  *B25J 19/00* (2006.01)
  *B25J 9/08* (2006.01)
  *B23K 9/12* (2006.01)

(52) U.S. Cl.
  CPC ........... *B25J 18/04* (2013.01); *B25J 19/0029* (2013.01); *B25J 19/0041* (2013.01)

(58) Field of Classification Search
  USPC ............... 74/490.01, 490.02, 606 R; 901/29; 200/51 R
  See application file for complete search history.

(56) References Cited

U.S. PATENT DOCUMENTS

| | | | |
|---|---|---|---|
| 6,250,174 B1 | 6/2001 | Terada et al. | |
| 6,622,585 B1* | 9/2003 | Salomonsson | B25J 19/0029 248/68.1 |
| 7,559,590 B1* | 7/2009 | Jones | B25J 19/0025 294/2 |
| 8,413,540 B2* | 4/2013 | Long | B25J 9/102 74/421 A |
| 2008/0156137 A1* | 7/2008 | Larsson | B25J 19/0025 74/490.02 |
| 2008/0236324 A1* | 10/2008 | Inoue | B25J 9/046 74/490.02 |
| 2013/0104685 A1* | 5/2013 | Long | B25J 19/0029 74/490.03 |
| 2013/0260606 A1* | 10/2013 | Hahakura | H01R 13/60 439/534 |
| 2014/0020498 A1* | 1/2014 | Adachi | B25J 19/0029 74/490.02 |
| 2014/0083229 A1* | 3/2014 | Kume | B25J 19/0025 74/490.02 |
| 2014/0109712 A1* | 4/2014 | Ono | B25J 9/042 74/490.02 |
| 2014/0290415 A1* | 10/2014 | Hasuo | B25J 19/0025 74/490.02 |
| 2015/0027261 A1 | 1/2015 | Okahisa et al. | |
| 2015/0068348 A1* | 3/2015 | Kirihara | B25J 17/02 74/490.03 |
| 2015/0114162 A1* | 4/2015 | Kirihara | B25J 19/0029 74/490.02 |
| 2016/0031094 A1* | 2/2016 | Tsutsumi | B25J 19/0008 74/490.05 |
| 2016/0089794 A1* | 3/2016 | Niu | B25J 19/0029 74/490.02 |
| 2016/0114491 A1* | 4/2016 | Lee | B25J 19/0029 74/490.06 |
| 2016/0256999 A1 | 9/2016 | Kinoshita et al. | |
| 2016/0297081 A1 | 10/2016 | Watanabe et al. | |
| 2018/0229362 A1 | 8/2018 | Kinoshita et al. | |

FOREIGN PATENT DOCUMENTS

| | | |
|---|---|---|
| EP | 3064324 A1 | 9/2016 |
| JP | S59-097888 A | 6/1984 |
| JP | S60-034282 A | 2/1985 |
| JP | S61-39385 U | 3/1986 |
| JP | H04-336993 A | 11/1992 |
| JP | H05-069362 A | 3/1993 |
| JP | H05-057780 U | 7/1993 |
| JP | H07-124887 A | 5/1995 |
| JP | H10-175188 A | 6/1998 |
| JP | H11-135965 A | 5/1999 |
| JP | 2006-021299 A | 1/2006 |
| JP | 2006-321026 A | 11/2006 |
| JP | 2009-113188 A | 5/2009 |
| JP | 2009-184049 A | 8/2009 |
| JP | 2010-036231 A | 2/2010 |
| JP | 2014-159081 A | 9/2014 |
| JP | 2015-058515 A | 3/2015 |
| JP | 2016-159399 A | 9/2016 |
| JP | 2016-190282 A | 11/2016 |
| JP | 2016-198849 A | 12/2016 |

OTHER PUBLICATIONS

Search Report submitted to Japanese Patent Office by an external searching organization dated Jan. 24, 2019 in corresponding Japanese Application No. 2017-101025; 13 pages.

* cited by examiner

INDUSTRIAL ROBOT

CROSS-REFERENCE TO RELATED APPLICATIONS

This application is based on Japanese Patent Application No. 2017-101025, the contents of which are incorporated herein by reference.

FIELD

The present invention relates to an industrial robot.

BACKGROUND

In the related art, there is a known upright articulated industrial robot that is provided with an integral cable that is connected from a control device to a base for a turning axis, the base being disposed at the bottom of the robot, and that is branched while being wired from the base to motors disposed in upper sections of the robot, to be connected to the motors for the respective axes (for example, see Japanese Unexamined Patent Application, Publication No. Hei 10-175188).

SUMMARY

The present invention provides the following solutions.

According to one aspect, the present invention provides an industrial robot including: a second arm that is provided, at the distal end of a first arm that is pivotable about a first axis, in a pivotable manner about a second axis parallel to the first axis; and a wrist that is disposed at the distal end of the second arm and that has a plurality of wrist elements including a first wrist element provided in a rotatable manner about the longitudinal axis of the second arm disposed at a position offset with respect to the second axis, wherein a motor that drives the wrist element other than the first wrist element of the wrist is accommodated in a space inside the first wrist element; the second arm is provided with, in the vicinity of the second axis, a hollow portion that communicates with the space; and a cable to be wired to the motor is wired into the hollow portion from the outside of the second arm via a through-hole that penetrates through a wall section of the second arm and is relayed by a connector fixed to the wall section at the position of the through-hole.

DETAILED DESCRIPTION

An industrial robot 1 according to one embodiment of the present invention will be described below with reference to the drawings.

Figure 1:
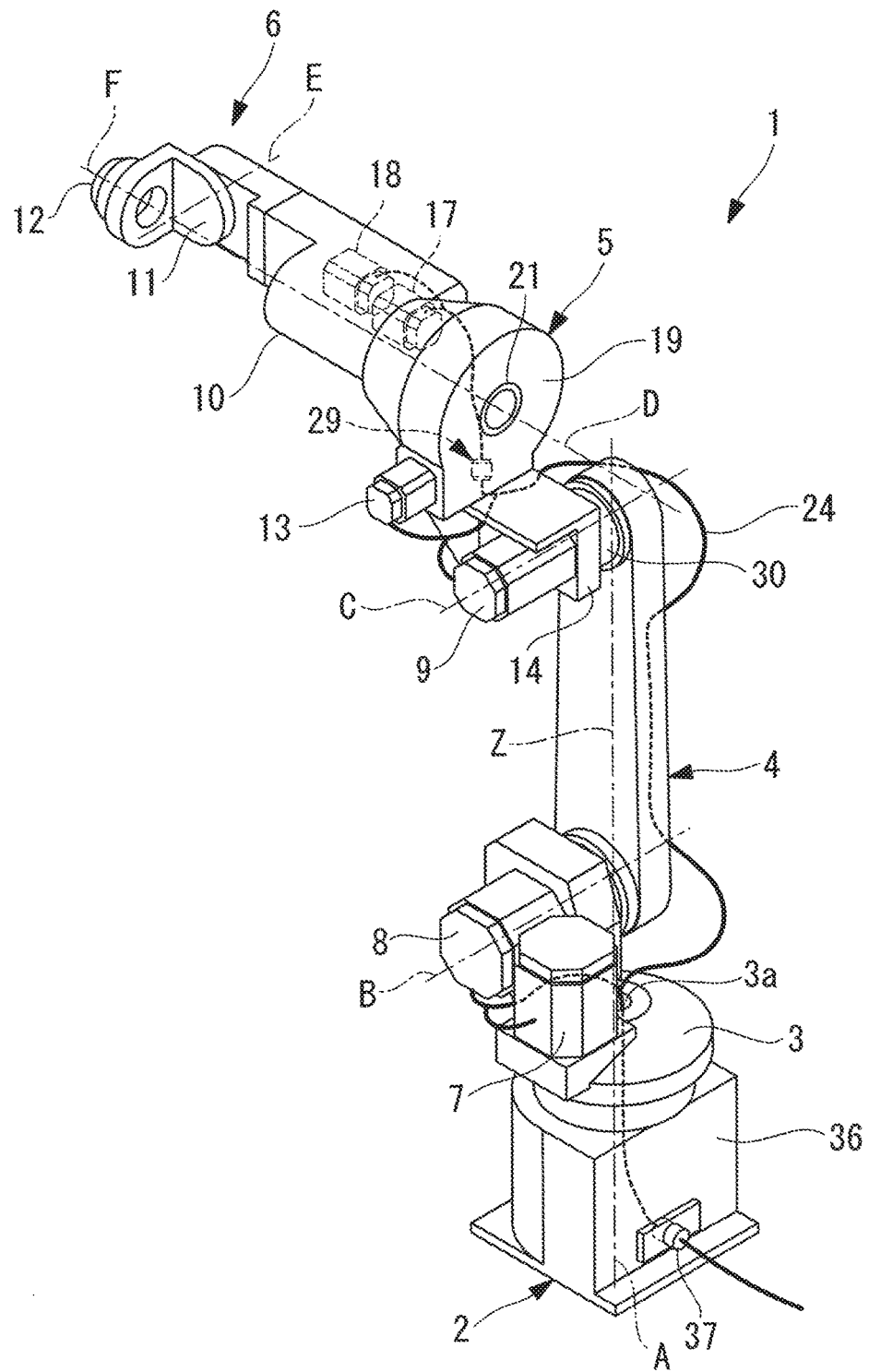
FIG. 1 is a perspective view showing an industrial robot according to one embodiment of the present invention.

As shown in FIG. 1, the industrial robot 1 of this embodiment is provided with: a turning part 3 that is supported in a rotatable manner about a vertical first axis A, by a base 2 installed on the ground; a first arm 4 that is supported by the turning part 3 in a pivotable manner about a horizontal second axis (first axis) B; a second arm 5 that is supported at the distal end of the first arm 4 in a pivotable manner about a third axis (second axis) C that is parallel to the second axis B; and a three-axis wrist 6 that is attached to the distal end of the second arm 5.

A first motor 7 that drives the turning part 3 and a second motor 8 that drives the first arm 4 are fixed to the turning part 3. Reducers (not shown) are each disposed between the base 2 and the turning part 3 and between the turning part 3 and the first arm 4, so that the speeds of rotations of the first motor 7 and the second motor 8 are reduced and transferred to the turning part 3 and the first arm 4, thereby rotating the turning part 3 and the first arm 4 by large torques.

A third motor 9 that drives the second arm 5 with respect to the first arm 4 is fixed to the second arm 5, and the second arm 5 is made to pivot with respect to the first arm 4 by a large torque amplified by a reducer 30 disposed between the first arm 4 and the second arm 5.

The wrist 6 is provided with: a first wrist element (wrist element) 10 that is supported, at the distal end of the second arm 5, in a rotatable manner about a fourth axis (longitudinal axis of the second arm 5) D that is offset with respect to the third axis C and that intersects with the first axis A; a second wrist element (wrist element) 11 that is supported, at the distal end of the first wrist element 10, in a rotatable manner about a fifth axis E that intersects with the fourth axis D; and a third wrist element (wrist element) 12 that is supported, at the distal end of the second wrist element 11, in a rotatable manner about a sixth axis F that intersects with the fifth axis E and that serves as the final axis.

A fourth motor 13 that drives the first wrist element 10 is fixed to the second arm 5, side by side with third motor 9, which drives the second arm 5.

Figure 2:
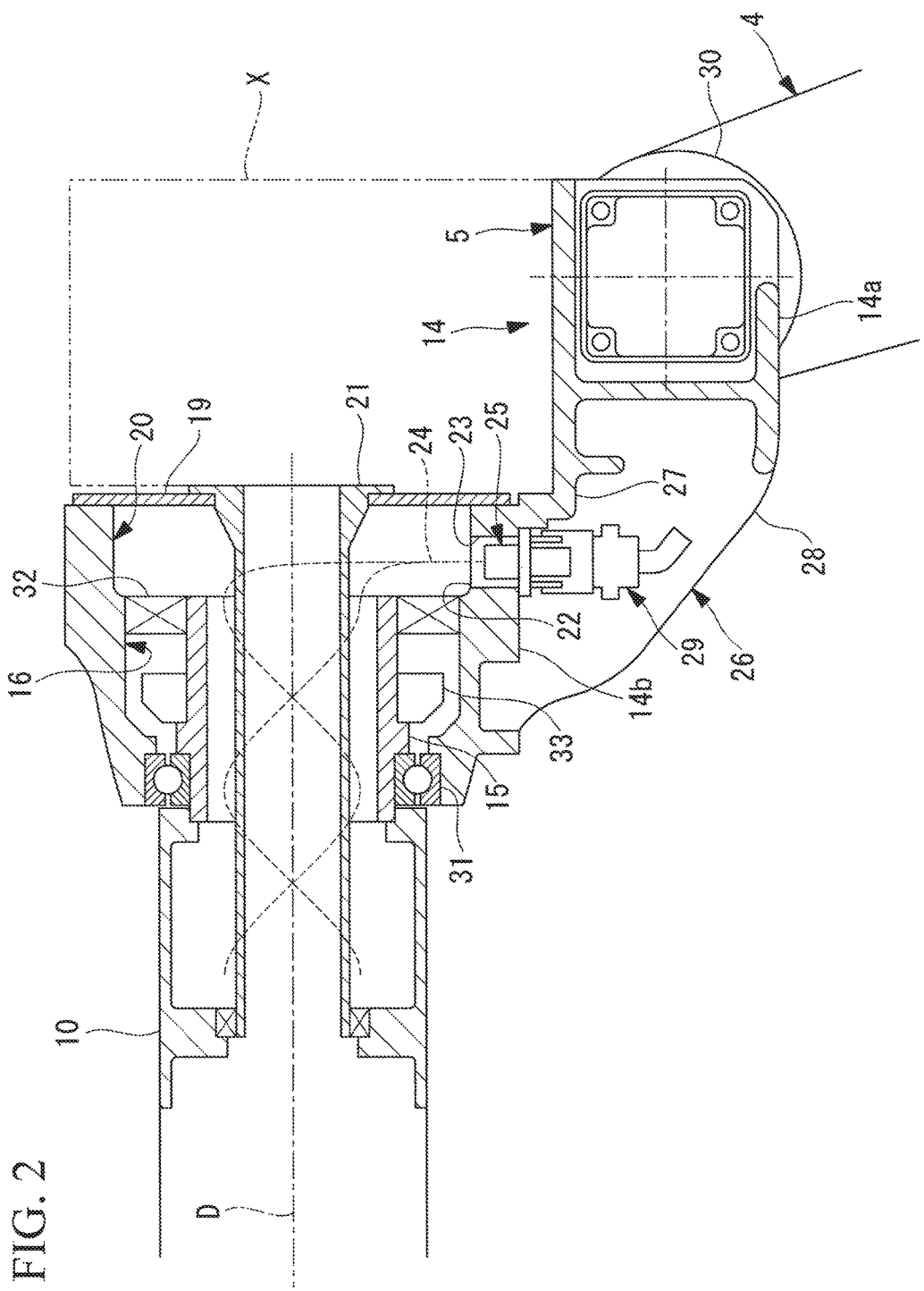
FIG. 2 is a partial longitudinal sectional view showing an internal structure of a second arm of the industrial robot shown in FIG. 1.

As shown in FIGS. 1 and 2, the second arm 5 is provided with a gearbox 16 obtained by sealing, with a seal member 32, a cylindrical space surrounded by: a second arm base 14 that is attached to the distal end of the first arm 4 in a pivotable manner about the third axis C; and a cylindrical member 15 that is attached to the second arm base 14 in a rotatable manner about the fourth axis D by means of a bearing 31. A ring-like gear 33 that is engaged with a gear (not shown) attached to the fourth motor 13, which drives the first wrist element 10, is fixed to the cylindrical member 15, and the engagement of the gear 33 is lubricated with grease enclosed in the space. The speed of rotation of the fourth motor 13 is reduced by the gear ratio, so that the cylindrical member 15 is rotated by a large torque.

The first wrist element 10, which is hollow, is fixed at the distal end of the cylindrical member 15. As shown in FIG. 1, motors 17 and 18 that respectively drive the second wrist element 11 and the third wrist element 12 are contained in the interior space of the first wrist element 10.

A hollow portion 20 that is closed by a lid member 19 is provided at the rear of the gearbox 16 in the second arm base 14. A cylindrical sleeve member 21 is fixed to the lid member 19, the cylindrical sleeve member 21 extending along the fourth axis D and being disposed radially inward of the cylindrical member 15 with a gap therebetween.

Accordingly, the hollow portion 20, which is located at the rear of the gearbox 16 in the second arm base 14, communicates with the space in the first wrist element 10 via the cylindrical gap between the cylindrical member 15 and the sleeve member 21.

In the state of FIG. 2, in which the fourth axis D is set substantially horizontal, a wall section 22 located at a lower section of the hollow portion 20, which is located at the rear of the gearbox 16, has a through-hole 23 that penetrates through the wall section 22 so as to communicate with the exterior space of the hollow portion 20.

Then, a cable 24 for the motors 17 and 18, which are disposed in the space in the first wrist element 10 and which are used for the second wrist element 11 and the third wrist element 12, is wired through the through-hole 23.

A receptacle (connector) 25 is fixed to the wall section 22 of the second arm 5 at the position of the through-hole 23, so that a connector 29 for the cable 24 that has been wired from the base 2, to be described later, is connected thereto.

The cable 24, which extends from the receptacle 25 to the inside of the hollow portion 20 of the second arm 5, is branched into two parts, in the hollow portion 20, as indicated by broken lines in FIG. 2. The branched parts of the cable 24 are made to pass through the cylindrical space between the cylindrical member 15 and the sleeve member 21 in a slackened state and are connected to the two motors 17 and 18, which are contained in the first wrist element 10 and which are used for the second wrist element 11 and the third wrist element 12.

As shown in FIG. 2, the second arm base 14 has substantially an L-shape in longitudinal section so as to integrally connect a first section 14a that is attached to the first arm 4 and to which the third motor 9 for driving the second arm 5 is attached and a second section 14b that is disposed around the fourth axis D and that forms the gearbox 16 and the hollow portion 20. As indicated by a two-dot chain line X in FIG. 2, a space where a work-tool control device (see FIG. 3) 35, such as a welding-wire feeding device, is to be installed is provided at an inner region of the substantially L-shaped second arm base 14. A welding wire, a cable, a pipe, etc. (not shown) for a work tool pass through the space inside the sleeve member 21 and are guided, in the vicinity of the fourth axis D, up to the distal end of the wrist 6.

Figure 4:
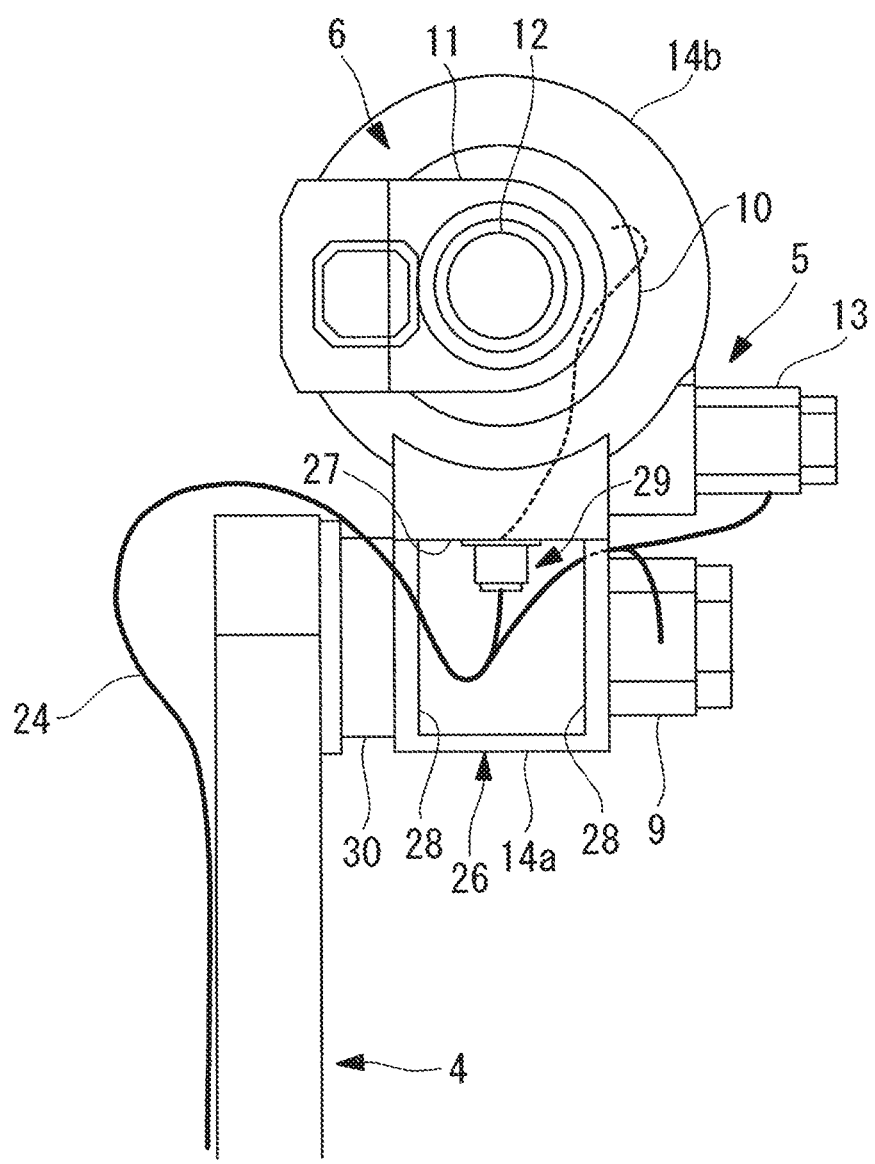
FIG. 4 is a partial front view showing the example routing shown in FIG. 3.

Furthermore, as shown in FIGS. 2 and 4, a concave portion 27 that is sandwiched between two ribs 28 provided with a gap therebetween in the direction of the third axis C is formed in a connection part 26 that integrally connects the first section 14a and the second section 14b at a corner region of the substantially L-shaped second arm base 14. Then, as shown in FIG. 2, the connector 29, which is connected to the receptacle 25 fixed in the through-hole 23 in the second arm base 14, as described above, is accommodated in the concave portion 27.

Figure 3:
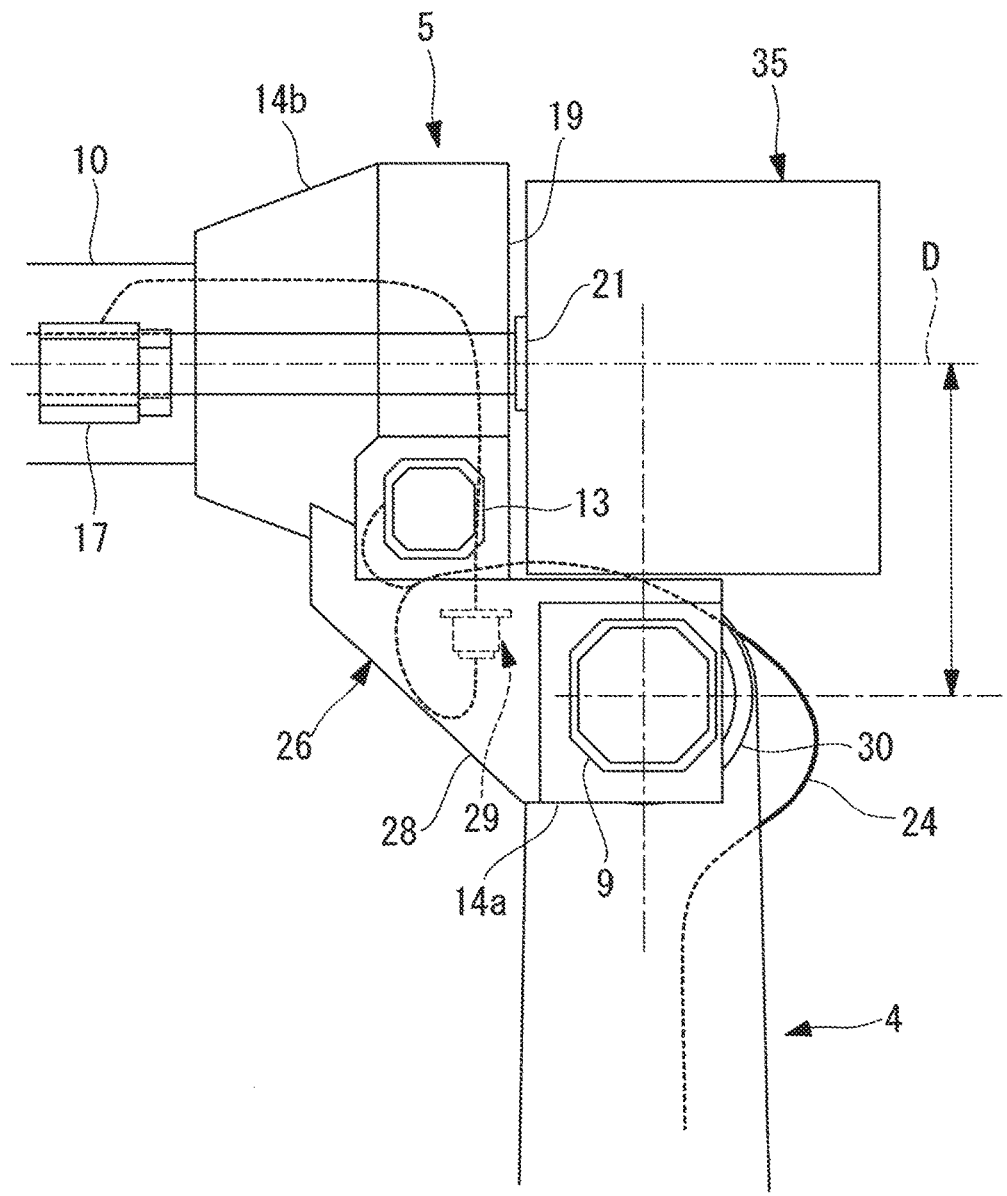
FIG. 3 is a partial side view showing example routing of a cable from a first arm to the second arm of the industrial robot shown in FIG. 1.

In the industrial robot 1 of this embodiment, wiring of the cable 24 for the respective motors 7, 8, 9, 13, 17, and 18 for the respective axes A, B, C, D, E, and F is performed as shown in FIGS. 1, 3, and 4.

Specifically, the cable 24 extending from a control device (not shown) is relayed by a connector 37 at a switchboard 36 provided on the base 2, which is disposed at the bottom of the industrial robot 1. In this embodiment, a single cable 24 is used to supply both electric power and signals.

The cable 24 that has entered the base 2 from the switchboard 36 and that is now in a mechanical section is made to rise in the vicinity of the first axis A and is exposed to the outside from an upper opening 3a in the turning part 3. At this position, parts of the cable 24 for the two first and second motors 7 and 8, which drive the turning part 3 and the first arm 4, are branched off and are connected to the respective motors 7 and 8.

The remaining part of the cable 24 is slackened so as to have an extra length for allowing movement, is then fixed to an outer surface of the first arm 4 along the longitudinal axis Z of the first arm 4 from the second axis B to the third axis C, is slackened so as to have an extra length for allowing movement in the vicinity of the third axis C, and is guided to the second arm 5. At this position, as shown in FIGS. 3 and 4, parts of the cable 24 for the two third and fourth motors 9 and 13, which drive the second arm 5 and the first wrist element 10, are branched off and are connected to the motors 9 and 13. The connector 29 is provided at the distal end of the remaining part of the cable 24 and is connected to the receptacle 25, which is exposed between the ribs 28 located in a lower section of the second arm base 14, as described above.

The operation of the thus-configured industrial robot 1 of this embodiment will be described below.

According to the industrial robot 1 of this embodiment, parts of the cable 24 to be connected to the motors 17 and 18, which are accommodated in the space inside the first wrist element 10 and which drive the second wrist element 11 and the third wrist element 12, are relayed by the connector 29 at the lower section of the second arm base 14, thereby making it possible to detach the parts of the cable 24 from the other parts of the cable 24 that are exposed to the outside of the mechanical section.

Because the parts of the cable 24 that are exposed to the outside of the mechanical section can be easily accessed from the outside, the maintenance thereof is easy, whereas it is subjected to damage due to contact with peripherals. If the exposed parts of the cable 24 are damaged, the exposed parts of the cable 24 are disconnected by means of the connector 29, thereby making it possible to detach only the exposed parts of the cable 24 without detaching the parts of the cable 24 that are disposed in the interior space extending from the second arm base 14 to the first wrist element 10.

As a result, it is not necessary to perform a disassembly operation for detaching the parts of the cable 24 disposed in the first wrist element 10 or to perform a reattachment operation. In particular, because proper adjustment of the movable cable, which passes through the cylindrical gap from the hollow portion 20 of the second arm base 14 and which is guided to the space inside the first wrist element 10, requires time and effort, this adjustment is eliminated, thereby bringing about an advantage in that the maintainability can be significantly improved.

Furthermore, according to the industrial robot 1 of this embodiment, the concave portion 27, which is formed between the two ribs 28 provided in order to improve the rigidity of the connection part 26 located between the first section 14a and the second section 14b of the second arm base 14, is used, and the connector 29 at the distal end of the cable 24 guided from the first arm 4 is accommodated in the concave portion 27. Accordingly, there is an advantage in that the concave portion 27 between the ribs 28, which is open to the outside, is easily accessed, attachment/detachment of the connector 29 is easy, and the connector 29 accommodated in the concave portion 27 can be protected from interference with outside peripherals by the ribs 28.

Note that, in this embodiment, although a description has been given of a case in which the parts of the cable 24 in the second arm base 14 and the first wrist element 10 are maintained, and the parts of the cable 24 on the side of the first arm 4 are replaced, instead of this, there is also an advantage in a case in which the wrist 6 is detached from the second arm 5 for replacement.

Figure 5:
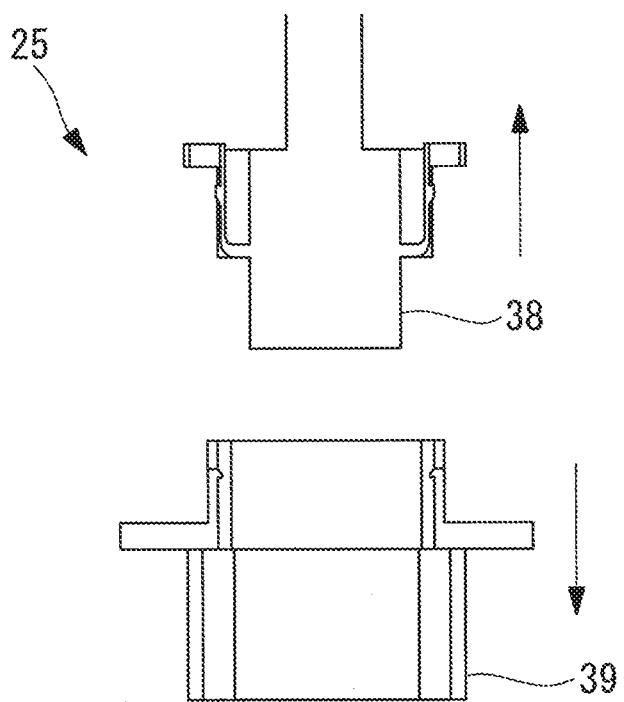
FIG. 5 is an exploded longitudinal sectional view showing the structure of a receptacle connector fixed to the second arm shown in FIG. 2.

Specifically, the receptacle 25, which is fixed to the second arm base 14, may be constituted of two parts, i.e., an insert 38 attached to the cable 24 and a mounting part 39 attached to the second arm base 14, as shown in FIG. 5, and these parts may be formed into a structure that allows easy attachment/detachment through snap fitting or the like, thereby making it possible to draw only the terminal part, together with the cable 24, into the hollow portion 20 of the second arm base 14.

Figure 6:
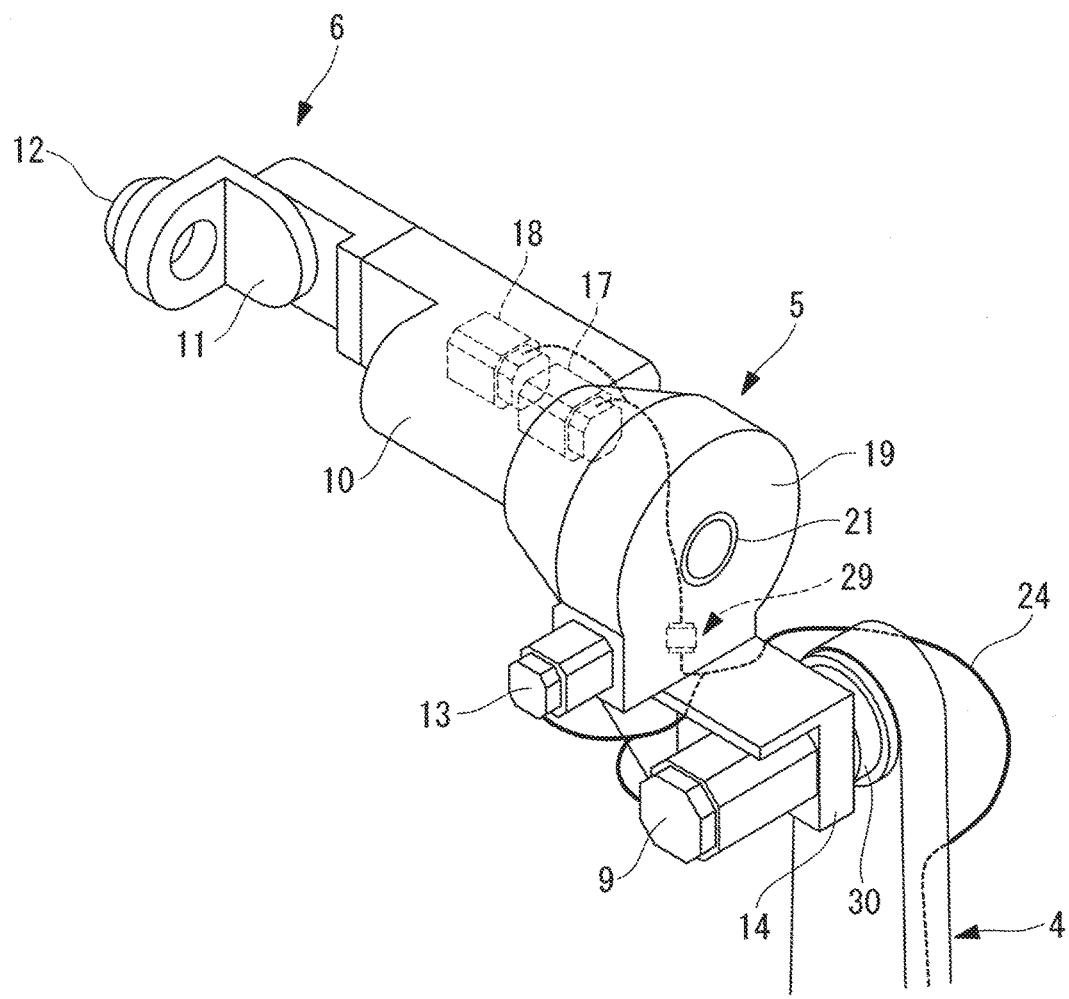
FIG. 6 is a partial perspective view showing a wrist of the industrial robot shown in FIG. 1.
Figure 7:
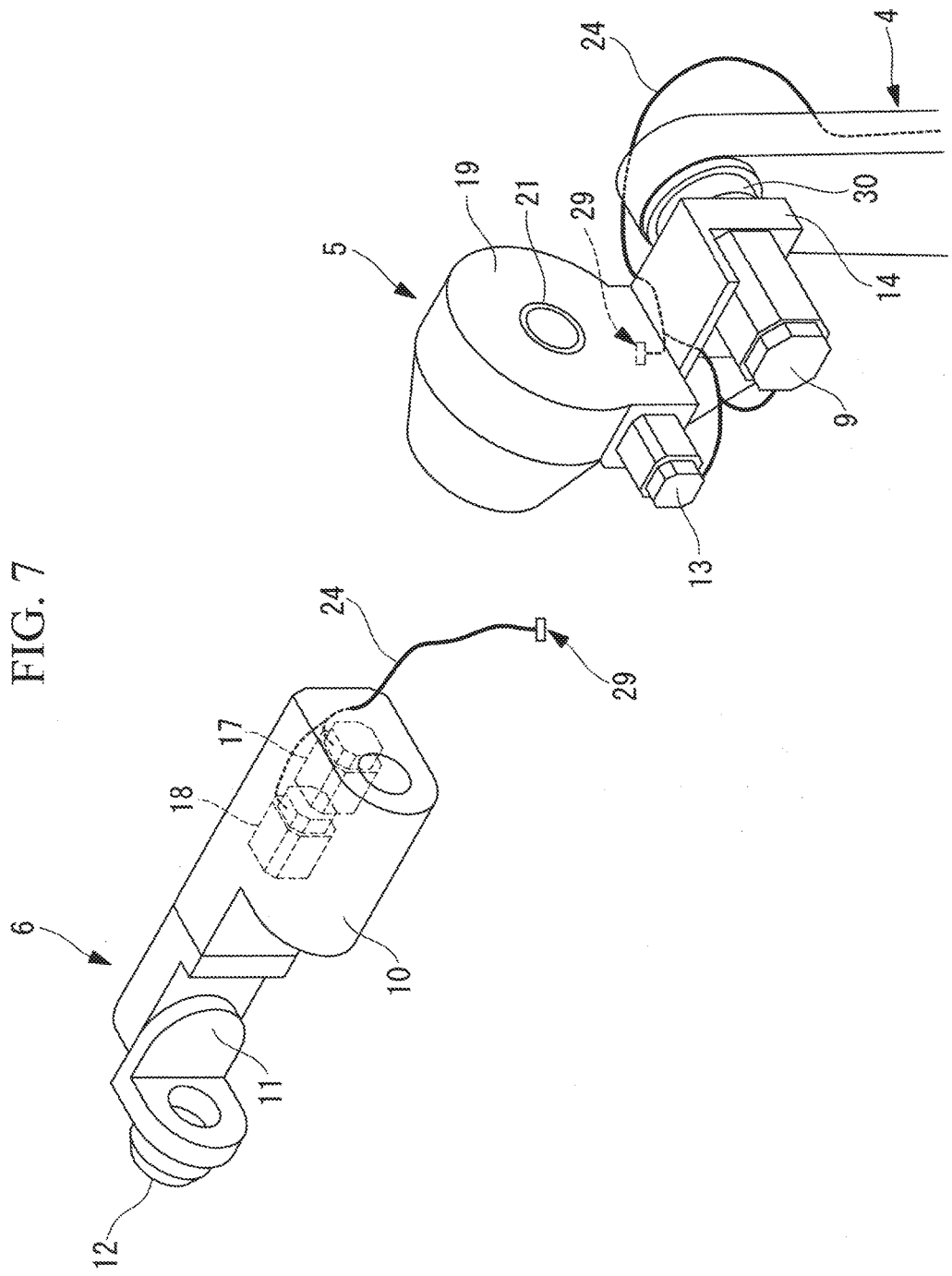
FIG. 7 is a partial perspective view showing a state in which the wrist shown in FIG. 5 is detached from a second arm base.
Figure 8:
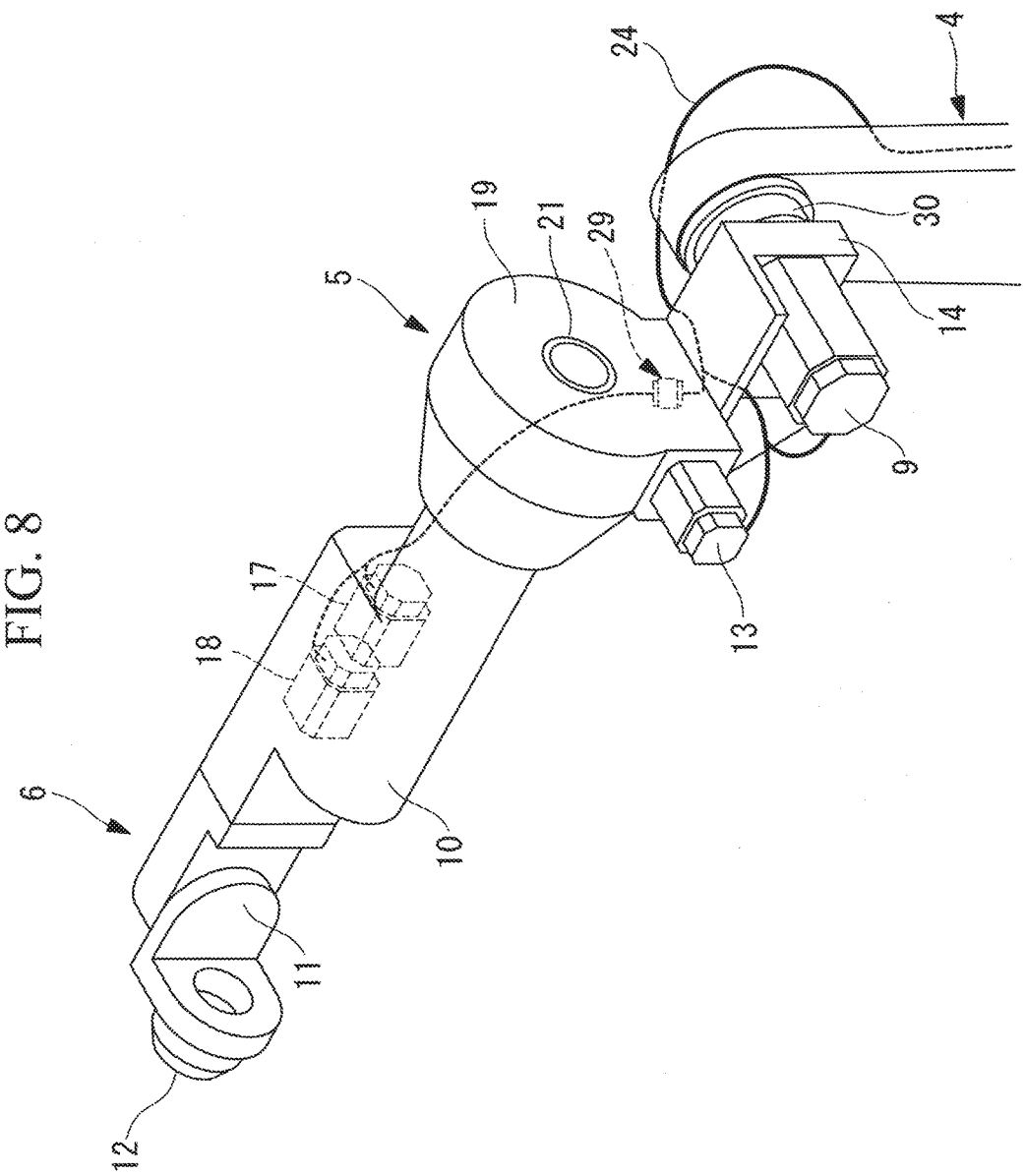
FIG. 8 is a partial perspective view showing a state in which a wrist longer than the wrist shown in FIG. 5 is attached.

By doing so, the lid member 19, which closes the rear side of the hollow portion 20, and the sleeve member 21, are pulled rearward, and the first wrist element 10 is detached frontward from the second arm base 14, thereby making it possible to detach, while the parts of the cable 24 are being connected to the motors 17 and 18 accommodated in the first wrist element 10, the parts of the cable 24 from the second arm base 14, as shown in FIGS. 6 and 7. Then, for example, as shown in FIGS. 6 and 8, the first wrist element 10 can be replaced with that having a different length, and, at this time, the parts of the cable 24 that extend up to the third motor 9, which drives the second arm 5, and the fourth motor 13, which drives the first wrist element 10, can be maintained as they are without being detached.

Therefore, there is an advantage in that it is possible to significantly reduce the time and effort required for the operation of replacement of the wrist 6 etc.

Furthermore, although a connector having any structure can be adopted as the connector 29, which relays the cable 24, if a bayonet-type connector is adopted, attachment/detachment can be performed more easily.

Furthermore, although the occupied space for the cable 24 and the connector 29 can be reduced because the single cable 24 supplies both electric power and signals, when there is enough space, the present invention can be applied to a case in which separate cables 24 supply electric power and signals.

Furthermore, although the connector 29 is accommodated by using the concave portion 27, which is formed between the two ribs 28 for reinforcing the second arm base 14, the connector 29 may be installed at any position and may perform relay in the vicinity of any position that penetrates the wall section 22 surrounding the hollow portion 20 located at the rear of the gearbox 16.

From the above-described embodiments and modifications thereof, the following aspects of the invention are derived.

According to one aspect, the present invention provides an industrial robot including: a second arm that is provided, at the distal end of a first arm that is pivotable about a first axis, in a pivotable manner about a second axis parallel to the first axis; and a wrist that is disposed at the distal end of the second arm and that has a plurality of wrist elements including a first wrist element provided in a rotatable manner about the longitudinal axis of the second arm disposed at a position offset with respect to the second axis, wherein a motor that drives the wrist element other than the first wrist element of the wrist is accommodated in a space inside the first wrist element; the second arm is provided with, in the vicinity of the second axis, a hollow portion that communicates with the space; and a cable to be wired to the motor is wired into the hollow portion from the outside of the second arm via a through-hole that penetrates through a wall section of the second arm and is relayed by a connector fixed to the wall section at the position of the through-hole.

According to this aspect, the first arm is made to pivot about the first axis, thereby making it possible to translationally move the second axis, and the second arm is made to pivot about the second axis, thereby making it possible to move the position of a device attached to the distal end of the wrist, which has the plurality of wrist elements. Then, the plurality of wrist elements are actuated, thereby making it possible to change the orientation of the device attached to the distal end of the wrist.

In this case, a cable for the motor, which drives the wrist element other than the first wrist element, extends from the first arm side, passes through the through-hole, which is formed in the wall section of the second arm in the vicinity of the second axis, passes via the hollow portion inside the second arm, and is connected to the motor, which is disposed in the space inside the first wrist element, the space communicating with the hollow portion. Then, because this cable is relayed by the connector at the position where the cable passes through the wall section of the second arm, when the connector is disconnected, only a part of the cable that is located closer to the first arm than the connector is can be easily replaced, while maintaining the cable from the hollow portion of the second arm up to the motor inside the first wrist element.

Specifically, because it is not necessary to disconnect the connection to the motor, which is accommodated in the space inside the first wrist element, the time and effort required to disassemble the first wrist element etc. can be omitted, and it is not necessary to perform a detachment operation and a reattachment operation for the movable cable extending from the connector, which is fixed in the wall section of the second arm, to the motor, which is fixed to the first wrist element rotating about the longitudinal axis of the second arm, thus reducing the time and effort required to replace the cable and making it possible to improve the maintainability.

In the above-described aspect, the connector may be accommodated in a concave portion that is formed on an outer surface of the second arm.

By doing so, the section of the connector exposed to the outside of the second arm is accommodated in the concave portion, thereby being protected from contact with an external device.

In the above-described aspect, the concave portion may be formed between ribs that are disposed on the outer surface of the second arm with a gap therebetween in the direction along the second axis.

By doing so, the connector can be protected by using the concave portion, which is formed between the ribs necessary to improve the rigidity of the second arm.

In the above-described aspect, the first wrist element may be provided so as to be replaceable with respect to the second arm; and the connector, which is provided at an end of the cable disposed in the hollow portion, may be provided so as to be detachable toward the hollow portion.

By doing so, when the first wrist element is detached from the second arm, the connector at the relay position is disconnected, and the connector for the cable disposed in the hollow portion is detached from the wall section of the second arm toward the hollow portion, thereby making it possible to detach, from the second arm, the first wrist element in which the cable is being connected to the motor. Accordingly, in a case in which the first wrist element is replaced if damaged or in a case in which the first wrist element is replaced with another first wrist element having a different length, a replacement operation can be performed without detaching the part of the cable located closer to the first arm than the second arm is.

According to the present invention, an advantageous effect is afforded in that the time and effort required to replace a cable is reduced, thus making it possible to improve the maintainability.

REFERENCE SIGNS LIST 1 industrial robot
4 first arm
5 second arm
6 wrist
10 first wrist element (wrist element)
11 second wrist element (wrist element)
12 third wrist element (wrist element)
17, 18 motor
20 hollow portion
22 wall section
23 through-hole
24 cable
25 receptacle (connector)
27 concave portion
28 rib
29 connector
B second axis (first axis)
C third axis (second axis)
D fourth axis (longitudinal axis)

The invention claimed is:

1. An industrial robot comprising: a first arm; a second arm that is provided, at the distal end of the first arm that is pivotable about a first axis, in a pivotable manner about a second axis parallel to the first axis; and a wrist that is disposed at the distal end of the second arm that has a plurality of wrist elements, including a first wrist element provided in a rotatable manner about the longitudinal axis of the second arm disposed at a position offset with respect to the second axis, wherein a motor that drives a wrist element other than the first wrist element of the wrist is accommodated in a space inside the first wrist element; the second arm is provided, in the vicinity of the second axis, with a hollow portion that communicates with the space; and a cable to be wired to the motor is wired into the hollow portion from the outside of the second arm via a through-hole that penetrates through a wall section of the second arm and is relayed by a connector fixed to the wall section at the position of the through-hole;

wherein the connector is accommodated in a concave portion that is formed on an outer surface of the second arm; and wherein the concave portion is formed between ribs that are disposed on the outer surface of the second arm with a gap therebetween in the direction along the second axis.

2. An industrial robot according to claim 1, wherein the first wrist element is provided so as to be replaceable with respect to the second arm; and the connector, which is provided at an end of the cable disposed in the hollow portion, is provided so as to be detachable toward the hollow portion.

* * * * *